United States Patent [19]
Baba et al.

[11] Patent Number: 4,622,553
[45] Date of Patent: Nov. 11, 1986

[54] RADAR DETECTOR

[75] Inventors: Yoshihiko Baba, Noda; Hiroshi Endo, Ichikawa, both of Japan

[73] Assignee: Uniden Corporation, Ichikawa, Japan

[21] Appl. No.: 652,468

[22] Filed: Sep. 20, 1984

[30] Foreign Application Priority Data

Sep. 20, 1983 [JP] Japan .................. 58-172261

[51] Int. Cl.⁴ ............................................. H04B 1/00
[52] U.S. Cl. ...................... 342/91; 375/93; 455/229; 342/16
[58] Field of Search ............. 343/7 A, 18 E, 5 PD, 343/5 R; 375/108, 93, 98, 97; 455/229, 227

[56] References Cited

U.S. PATENT DOCUMENTS 4,182,990  1/1980  Coffin et al. .................. 343/18 E
4,196,393  4/1980  Schweitzer .................. 343/18 E
4,280,223  7/1981  Roettele et al. .................. 375/93

Primary Examiner—Thomas H. Tarcza
Assistant Examiner—Donald E. Hayes
Attorney, Agent, or Firm—Oblon, Fisher, Spivak, McClelland & Maier

[57] ABSTRACT

A radar detector is disclosed which comprises a radar wave signal receiver for producing a detection output when the incident radar signal is synchronized with a local oscillation frequency at a certain sweeping time, first and second pulse train signal generators for producing pulses with different cycles, and a cycle alteration circuit for altering the cycle of the second pulse train signal generator in accordance with a logic output corresponding to the detection output from said receiver, thereby synchronizing such cycle with the cycle of the first pulse train signal generator. The regular radar wave signal is discerned by the detection of coincidence between the output pulses from the first and second pulse train signal generators at certain time intervals. Consequently, the radar system is prevented from responding to interference noise or extraneous radar waves.

10 Claims, 2 Drawing Figures

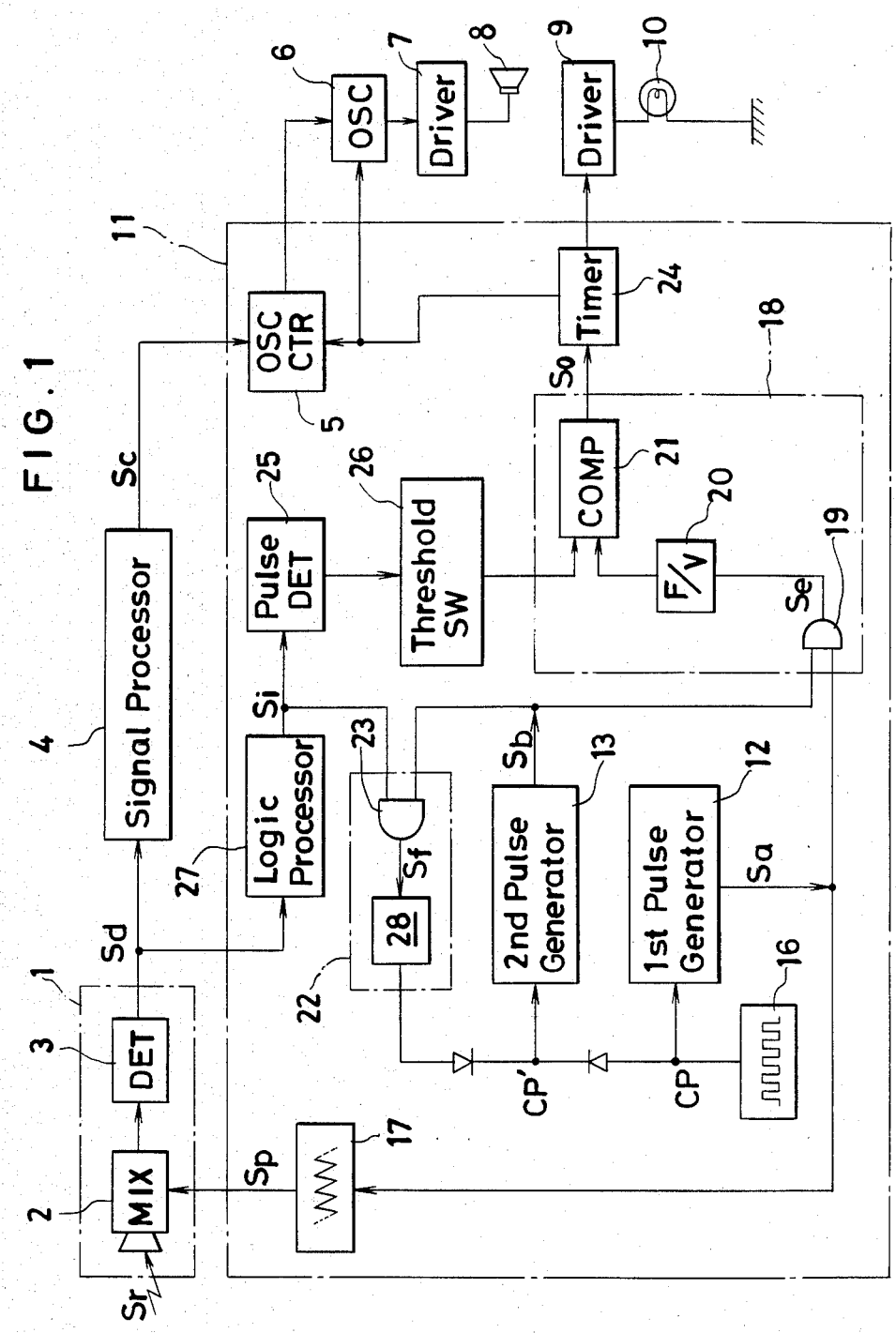

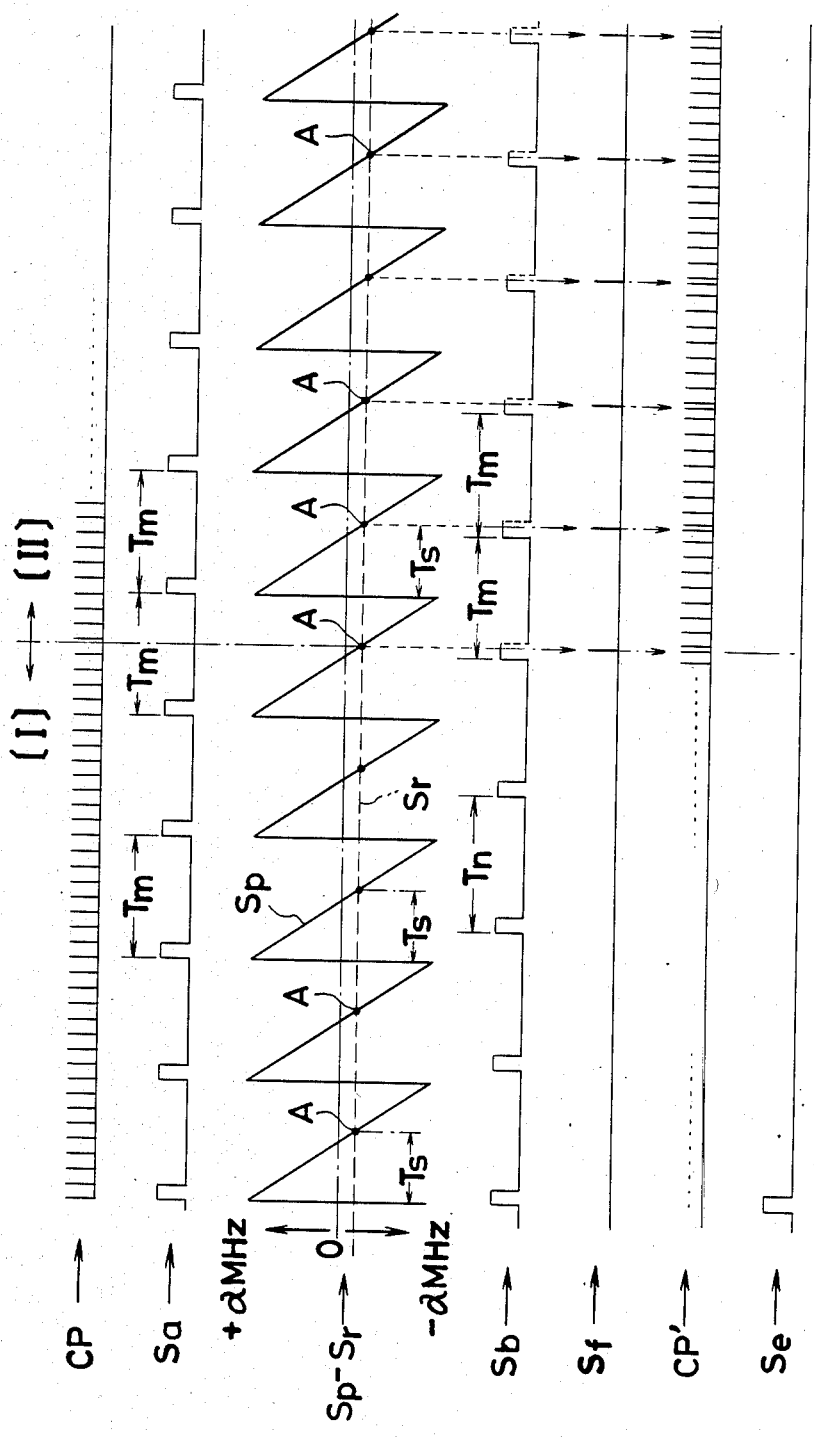

RADAR DETECTOR

FIELD OF THE INVENTION

This invention relates to a radar detector, and more particularly to a radar detector able to prevent erroneous operation due to extraneous radar waves such as those radiated from other radar detectors.

BACKGROUND OF THE INVENTION

Recently, microwave radars have come into extensive use for determining the velocity and distance of moving objects or for detecting the presence of objects. Generally, the microwave radar of this type requires a radar detector capable of detecting the specific radar waves emitted from the radar.

There are several types of radar detectors using different modes of reception. Unfortunately, however, all types are vulnerable to interference, particularly from external pulse noise. Moreover, they are incapable of precisely discriminating between regular radar waves and leakage radar waves from nearby radar detectors of the single-conversion type. Thus, there is a fair possibility of extraneous waves being confused with the regular radar waves emitted from the regular radar source.

OBJECT OF THE INVENTION

In view of the problems described above, this invention aims at providing a radar detector which avoids responding to extraneous radar waves and radar waves emitted from other radar detectors, precludes erroneous operation due to such radar waves, and detects the regular radar waves emitted from the regular radar source with high reliability.

SUMMARY OF THE INVENTION

To accomplish the object described above, the radar detector of this invention comprises a radar wave signal receiver adapted to produce a detection signal when an incident radar wave signal is synchronized with a local oscillation frequency at a certain sweeping time, a first pulse train signal generator for feeding pulses for sweeping the local oscillation frequency at fixed intervals, a second pulse train signal generator for asynchronously generating pulse train signals of a cycle different from the cycle of the first pulse train signal generator, a cycle alteration circuit for altering the cycle of the second pulse train signal generator in accordance with the logic output obtained from the detection output from the receiver so as to synchronize with the cycle of the first pulse train signal generator, an asynchronism/synchronism detection circuit adapted to determine whether or not the output pulses from the first and second pulse train signal generators are synchronized with each other at certain time intervals, and a control circuit for validating the detection signal in accordance with the synchronism detection signal issued from the asynchronism/synchronism detection circuit.

The cycle of the output pulse trains of the first and second pulse train signal generators synchronizes only with the regular radar waves and not with extraneous radar waves. The asynchronism/synchronism detection circuit detects the asynchronism and, in response, issues an asynchronism detection signal, namely a signal indicating that no radar waves are being received. Conversely, the synchronism detection signal of the asynchronism/synchronism detection circuit serves as a signal for confirming reception of the regular radar wave signal.

BRIEF DESCRIPTION OF THE DRAWINGS

FIG. 1 is a block diagram of a radar detector as one preferred embodiment of the present invention.

FIG. 2 is an explanatory time-chart diagram illustrating the signals handled by the essential part of the circuit of FIG. 1.

DESCRIPTION OF PREFERRED EMBODIMENT:

First, the construction of the conventional radar detector will be described with reference to FIG. 1, which is a block diagram of one preferred embodiment of the present invention. A radar wave signal receiver 1 for receiving radar wave signals Sr is composed of a mixer (MIX) 2 for frequency conversion and a detector (DET) 3 for detecting an intermediate frequency signal from the mixer 2. This mixer 2 is supplied with a local oscillation frequency for sweeping a range corresponding to that of the radar wave frequencies to be received. In the present embodiment, the sweeping command is effected by the sawtooth waves from a sawtooth oscillator 17 disposed outside the receiver 1. One of the characteristics of this invention is that the drive or trigger signal for the sawtooth wave oscillator 17 is derived from a first pulse train signal generator 12 which, in its normal state, retains a prescribed relation of asynchronous cycle relative to the second pulse train signal generator 13. This point will be described more fully afterward.

The intermediate frequency signal from the mixer 2 is subjected to FM detection, for example, at the detector 3. The intermediate frequency input to the detector 3 generally falls in the range of 10 to 100 MHz. Some intermediate frequency signals require DC detection. In this case, the detector 3 naturally functions as a DC detector. The present invention applies also to a radar detector of this type.

The detection output signal Sd from the detector 3 is converted into a signal of convenient form in a detection signal processor 4. This invention does not extend to the construction of the detection signal processor 4, namely to the purpose of use or application of the detection output signal Sd. For the sake of simplicity of description, it is assumed that in the present embodiment, the detection signal will be processed for the purpose of generating a detection sound whose interval varies in proportion to the intensity of the radar wave or to the distance to the radar emission source.

A detection signal processor 4 for such a purpose can be designed by known techniques so as to convert the detection signal Sd into a detection voltage signal Sc of a voltage faithfully proportionate with the intensity of reception. The detection voltage signal Sc controls an oscillator (OSC) 6 through an oscillator control circuit (OSC CTR) 5. This control is realized, for example, by adopting a voltage/duty converter in the oscillator control circuit 5 so as to increase the oscillation frequency of the oscillator 6 in proportion to the magnitude of the voltage of the detection voltage signal Sc. In this arrangement, since the oscillation interval of the oscillator 6 is shortened proportionally as the radar emission source is approached, the interval of the detection sound emitted from a detection sound radiator 8 (such as a speaker) driven by a driver 7 is quickly shortened.

The circuit arrangement corresponding to the main signal path in the conventional radar detector has been described. Now, a circuit 11 for preventing or discerning erroneous operation in accordance with the present invention will be described.

In the present embodiment, if an extraneous signal is received by the radar wave signal receiver 1 and is detected not to be the regular radar wave signal Sr, the detection signal Sd or Sc based on the detection can be effectively nullified by disabling the oscillator control circuit 5.

As already described, the local oscillation frequency is swept at prescribed intervals. Therefore, in the present embodiment, the first pulse train signal generator 12, which issues the trigger signal or control signal to the sawtooth wave oscillator 17, and the second pulse train signal generator 13, which in the normal state and in the state of asynchronism relative to radar waves retains the relation of asynchronism with respect to the first pulse train signal generator 12, are formed with m-and n-notation counters sharing a single clock pulse generator 16 (n=m+1 in this invention). For simplicity, m is 9 and n is 10 in the present embodiment but these notations are not limited to these particular numerals. In the present embodiment, therefore, the first pulse train signal generator 12 includes a 9-notation counter and the second pulse train signal generator 13 a 10-notation counter.

FIG. 2 shows a time chart of the signals processed by the essential part of the circuit of the present embodiment illustrated in FIG. 2. In the present embodiment, the cycles Tm, Tn of the pulse trains Sa, Sb from the 9-notation counter of the first pulse train signal generator 12 and the 10-notation counter of the second pulse train signal generator 13 have a time lag equal to one shot of the clock pulse CP generated by the clock pulse generator 16. The cycle at which the output pulses from these two counters coincide with each other is 10 times the cycle Tm of the 9-notation counter. The two output pulse trains Sa, Sb of the 9-notation counter and the 10-notation counter which have the aforementioned relation are sent to a two-input AND gate 19 of an asynchronism/synchronism detection circuit 18. As a result, the output pulses from the AND gate 19 have a cycle which is 10 times Tm.

If the output Se from the AND gate 19 is fed to an inversion frequency/voltage converter (F/V) 20, for example, the output voltage from the converter 20 will not rise above a certain level. If, conversely, the cycles of the 9-notation counter of the generator 12 and the 10-notation counter of the generator 13 are synchronized and the times at which the individual pulses Sa, Sb in the two pulse trains do not coincide, the output of the AND gate 19 has a cycle exceeding 10×Tm and therefore is not allowed to rise for a long time. Thus, the output potential of the inversion type frequency/voltage converter 20 will increase toward a certain saturated potential (generally power source potential). When the output potential of this inversion type frequency/voltage converter 20 is compared by means of a comparator 21 possessing a suitable threshold potential set in advance, there can be obtained a logic output So which varies with the outcome of the asynchronism/synchronism detection. The height of the logic level of the output signal So serves as a basis for discrimination between regular radar waves and extraneous radar waves. In the case of the detection of synchronism, a high logic level is produced as a signal confirming that the received signal is the regular radar wave signal Sr.

When the regular radar wave signal Sr is not being received, a state of asynchronism will exist between the 9-notation counter of the generator 12 and the 10-notation counter of the generator 13. In this case, the signal output by asynchronism/synchronism detection circuit 18, i.e. the asynchronism/synchronism detection signal So, corresponds to the logic low level and has absolutely no effect upon the remaining part of the circuit. This is the normal state of operation.

Now the manner in which the radar wave signal Sr is received and tested for synchronism in the detector 3 will be described.

On arrival of the radar wave signal Sr, the radar wave signal receiver 1, which may be of the conventional type, issues the detection signal Sd from its detector 3, as already described. The relation of synchronism between the detection signal Sd and the incoming radar wave signal Sr will be examined from the standpoint of time. As noted from the characteristic diagram of the sweeping signal radar signal (Sp-Sr) shown in FIG. 2, synchronization is determined from the fact that the prescribed beat with the radar wave signal Sr is attained at the specific point of time A each time the local oscillation frequency is swept over the range of ±aMHz for each shot of the pulses from the first pulse train signal generator 12. The radar wave signal Sr is normally a fairly stable frequency signal so that while the regular radar wave signal Sr is being received intersection of the radar wave signal Sr with the sweeping curve Sp of the local oscillation frequency occurs at a substantially fixed interval Ts as measured from the start of sweeping for each sweeping cycle, as shown by the model in the characteristic diagram of Sp-Sr in FIG. 2.

As stated previously, in this state of radar wave synchronism or detection, the present invention contemplates altering the cycle Tn of the output pulse train Sb of the second pulse train signal generator 13 so as to be synchronized with the cycle Tm of the output pulse train Sa of the first pulse train signal generator 12. For this purpose, the invention uses a cycle alteration circuit 22 of relatively simple configuration. In the present embodiment, the circuit 22 is formed of a simple feedback circuit incorporating an AND gate 23.

To be specific, the detection output Sd from the detector 3 is converted by a detection logic generation circuit (logic processor) 27 into a pulse signal or logic signal Si of a form convenient for subsequent processing. This pulse output Si is applied to one input to the AND gate 23 of the cycle alteration circuit 22 and, at the same time, the output Sb from the second pulse train signal generator 13 is applied to the other input to the AND gate 23. The output Sf from the AND gate 23 is fed back to the second pulse train signal generator 13 via a suitable wave shaping circuit 28 serving to reshape the output into a waveform similar to the waveform of the clock pulse. The logic processor 27 may be formed of a two-input analog comparator, for example. When the detection signal Sd is applied to one of the two inputs and a suitable reference potential is applied to the other input, this comparator can produce at its output terminal a desired pulse signal Si which rises each time a stable detection signal is obtained.

As viewed relative to the cycle Tm of the output pulse train signal Sa of the first pulse train signal generator 12 which, as described above, defines the start of the local oscillation frequency sweeping by the head of each cycle, the successive output pulses Sb of the second pulse train signal generator 13 appear to shift in position within the time width Tm each time one cycle is completed.

Thus, if there arises a time zone I as shown in the left half of the diagram of FIG. 2 in which, despite the detection of the radar wave signal Sr in the detector 3, the time at which the output pulse signal Sb of the second pulse train signal generator 13 rises does not coincide with the time A of detection of synchronization during each sweeping cycle, there will eventually arise the condition wherein the time A for the radar wave synchronization coincides with the rising time of the output pulse Sb of the second pulse train signal generator 13 as indicated in the beginning part of the time zone II in the right half of the diagram of FIG. 2.

When this condition is realized, the expected AND is obtained in the AND gate 23 within the cycle alteration circuit 22 and the resultant output pulse Sf is shaped and fed back to the second pulse train signal generator 13. As a result, the incoming clock pulse CP in effect is increased by the increment of one clock pulse on the part of the second pulse train signal generator 13 as in the case of the signal CP of FIG. 2. In this condition, therefore, the second pulse train signal generator 13 is synchronized with the first pulse train signal generator 12.

Also at the time point A for radar wave synchronization or detection in the next sweeping cycle, therefore, the output pulse Sb of the second pulse train signal generator 13 is enabled to rise substantially at the same time without fail. The output pulse Sf from the AND gate 23 is similarly allowed to be fed back again to the second pulse train signal generator 13 via the waveform shaping circuit 28. Thus, the same operation can be expected to be obtained in the next cycle.

On the other hand, the time at which the output pulse Sb of the second pulse train signal generator 13 rises with respect to the rising time of the output pulse Sa of the first pulse train signal generator 12 remains deviated because their respective cycles have been synchronized. Therefore, the AND gate 19 of the asynchronism-/synchronism detection circuit 18 cannot assume the status of AND so long as the time zone II continues to exist. Consequently, the output of the inversion type frequency/voltage converter 20 rises past the threshold value of the comparator 21 and the asynchronism/synchronism detection signal So which appears in the output of the comparator 21 represents detection of synchronism, namely logic high level, indicating reception of the regular radar wave.

Owing to the mechanism described above, the signal So is never allowed to assume logic high level at the time that interference or noise is received instead of the regular radar wave signal Sr.

The regular radar wave signal Sr can be regarded as a signal whose frequency is substantially constant over the entire sweeping cycle of the local oscillation frequency. In contrast, an interference signal of the type swept within a fixed frequency range corresponding to the local oscillation frequency in another radar detector varies in frequency each time the sweeping cycle of the local oscillation frequency within the main circuit is shifted to the next cycle and, as a result, the first and second pulse train signal generators are never allowed to be synchronized with each other during the reception of such an interference signal.

Similarly in the case of transient noise, synchronism occurs quite at random and is never obtained at one same point in all successive sweeping cycles of the local oscillation frequency.

From the foregoing description, it is clear that the regular radar wave signal is discriminated without fail in the circuit under discussion. Thus, the object of this invention can be attained by devising means of rendering the oscillator control circuit 5 as used in the present embodiment operable and consequently validating the detection signal Sd or Sc equivalently and effectively only at the time the output signal So of the asynchronism/synchronism detection circuit 18 rises to the logic high level.

In the present embodiment, a timer 24 is inserted in the line between the asynchronism/synchronism detection circuit 18 and oscillator control circuit 5. This timer 24 is included so that if a signal reasonably regarded as a regular radar signal is detected and the correctness of this detection is verified even just once in the error prevention circuit 11, the oscillator control circuit 5 over a certain length of time and conveniently causes a detection sound radiator 8 to issue a detection sound for a prescribed length of time through the oscillator 6 and the driver 7. Where a visible display is desired in addition to the detection sound, there may be provided a suitable driver 9 for causing a suitable light source 10 to flash on and off.

Where the cycle of interfering waves is vastly different from the sweeping cycle of the local oscillation frequency and the intensity of the disturbance is very strong, there is a possibility that the 9-notation counter and the 10-notation counter in the error prevention circuit 11 will be synchronized with each other, though only momentarily. As a countermeasure, it is desirable to install a threshold switch 26 capable of varying the threshold value of the comparator 21 so that each time a pulse detector 25 serving to monitor the output pulse Si from the logic processor 27 in terms of voltage detects a wave of great intensity, the threshold switch 26 will be driven to increase the threshold value of the comparator 21.

Further, a circuit for measuring the period of logic high level output from the comparator 21 may be installed so that the detection signal will not be validated unless the output pulse Si represents the logic high level over a prescribed length of time.

As is evident from the arrangement described above, the first and second pulse train signal generators incorporate counters of m-notation and n-notation, respectively. In this case, the numerals m, n can be selected with a fair degree of freedom. Naturally, the resolution of detection at the time of synchronization during one sweeping cycle of local oscillator frequency is enhanced in proportion as the value of these notations increase. As is plain from the foregoing, the present invention can be applied not merely radar systems involving continuous waves but also radar systems using pulse waves.

As described in detail above, this invention overcomes the disadvantage of the conventional radar detector and provides it will improved reliability. Thus, this invention can contribute greatly to further utilization of radar detectors of this type.

What is claimed is:

1. A radar detector, comprising:
   a radar wave signal receiver for altering the frequency of incident radar wave signals, sweeping the signal resulting from said frequency alteration with a local oscillation frequency, and producing a detection signal when the radar wave signal is synchronized with the local oscillation frequency, a first pulse train signal generator for producing pulses for sweeping said local oscillator frequency at fixed intervals, a second pulse train signal generator for asynchronously producing a pulse train signal of a cycle different from the cycle of said first pulse train signal generator, a cycle altering circuit for altering the cycle of said second pulse train signal generator with a logic output corresponding to the detection output of said radar wave signal receiver thereby synchronizing said cycle with the cycle of said first pulse train signal generator, an asynchronism/synchronism detection circuit for monitoring the output pulses of said first and second pulse train signal generators and determining whether or not said two pulses coincide with each other at certain time intervals, and a control circuit for enabling a synchronism detection signal produced by said asynchronism/synchronism detection circuit in consequence of absence of coincidence between the two output pulses from said first and second pulse train signal generators over a prescribed length of time to be validated into a serviceable form.

2. A radar detector according to claim 1, which further comprises a sawtooth wave oscillator capable of generating sawtooth waves as the local oscillation frequency to be supplied to said radar wave signal receiver.

3. A radar detector according to claim 1, wherein said radar wave signal receiver is formed of a mixer for effecting frequency alteration of the incident radar wave signal and a detector for detecting an intermediate frequency signal from said mixer.

4. A radar detector according to claim 1, wherein said first pulse train signal generator is formed of a counter of m notation and said second pulse train signal generator is formed of a counter of m+1 notation.

5. A radar detector according to claim 1, wherein said asynchronism/synchronism detection circuit is formed of an AND gate for deriving an AND signal from the two pulse outputs of said first and second pulse train signal generators, an inversion type frequency/voltage converter for producing a potential as reversed from the signal of said AND gate, and a comparator for comparing the output potential of said converter with a preset threshold potential and feeding out a logic signal variable with the outcome of said asynchronism/synchronism detection.

6. A radar detector according to claim 5, which further comprises a threshold value switch capable of varying said threhold value potential.

7. A radar detector according to claim 1, wherein a detection sound radiator is connected to said control circuit through an oscillator and a driver, whereby said detection sound radiator is driven to emit sound when a logic signal indicating the presence of synchronism is produced by said asynchronism/synchronism detection circuit.

8. A radar detector according to claim 7, wherein a timer is interposed between said control circuit and said oscillator on the one hand and said asynchronism/synchronism detection circuit on the other.

9. A radar detector according to claim 1, wherein a light source is connected to said asynchronism/synchronism detection circuit through a driver, whereby said light source is energized to emit flashing light when a logic signal indicating the presence of synchronism is produced by said asynchronism/synchronism detection circuit.

10. A radar detector according to claim 9, wherein a timer is interposed between said driver and said asynchronism/synchronism detection circuit.

* * * * *